United States Patent [19]
Jennings et al.

[11] Patent Number: 6,040,381
[45] Date of Patent: Mar. 21, 2000

[54] PREPARATION OF FILLED REACTIVE POLYURETHANE CARPET BACKING FORMULATIONS USING AN IN-LINE CONTINUOUS MIXING PROCESS

[75] Inventors: James K. Jennings, Rocky Face; Randall C. Jenkines, Dalton; Larry W. Mobley, Cohutta, all of Ga.

[73] Assignee: The Dow Chemical Company, Midland, Mich.

[21] Appl. No.: 09/267,273

[22] Filed: Mar. 12, 1999

Related U.S. Application Data

[62] Division of application No. 08/905,509, Aug. 4, 1997, Pat. No. 5,908,701
[60] Provisional application No. 60/033,128, Dec. 10, 1996.
[51] Int. Cl.$^7$ .................. C08J 3/00; C08J 9/00; C08J 11/00
[52] U.S. Cl. .............. 524/871; 528/44; 521/40; 521/50
[58] Field of Search .............. 524/871; 528/44; 521/40, 50

[56] References Cited

U.S. PATENT DOCUMENTS

| | | | |
|---|---|---|---|
| 4,515,646 | 5/1985 | Walker et al. | 156/78 |
| 4,715,912 | 12/1987 | Tillotson | 156/79 |
| 4,916,183 | 4/1990 | Barron et al. | 524/555 |
| 5,096,764 | 3/1992 | Terry et al. | 428/95 |
| 5,480,589 | 1/1996 | Belser et al. | 261/76 |

FOREIGN PATENT DOCUMENTS

| | | |
|---|---|---|
| 0 005 549 | 11/1979 | European Pat. Off. . |
| 0 427 295 A1 | 5/1991 | European Pat. Off. . |

OTHER PUBLICATIONS

D. Ramazzotti, "Dynamic Mixer with Metered Dry Filler Feed Capability", *Proceedings of the SPI 33$^{rd}$ Annual Technical/Marketing Conference*, pp. 125–128 1990.

*Primary Examiner*—Erma Cameron

[57] ABSTRACT

The present invention is a continuous process for preparing formulations useful for making filled polymer carpet backings. The present invention particularly incorporates polyisocyanate as a reactive diluent in a continuous process for preparing filled polyurethane polymers. Use of the present invention allows production of carpet backings that incorporate high loadings of filler materials.

8 Claims, No Drawings

PREPARATION OF FILLED REACTIVE POLYURETHANE CARPET BACKING FORMULATIONS USING AN IN-LINE CONTINUOUS MIXING PROCESS

This application is a Divisional of prior application Ser. No. 08/905,509 filed Aug. 4, 1997 now U.S. Pat. No. 5,908,701. This application also claims the benefit of U.S. Provisional Application No. 60/033,128, filed Dec. 10, 1996.

BACKGROUND OF THE INVENTION

The present invention relates to polymer-backed articles. The present invention particularly relates to polyurethane-backed articles, latex-backed articles, and to a process used in making same.

Articles having attached polyurethane foam layers are well known. For example, carpets and other substrates having attached polyurethane foam layers as backing are described in U.S. Pat. Nos.: 3,755,212; 3,821,130; 3,862,879; 4,022,941; 4,171,395; 4,278,482; 4,286,003; 4,296,159; 4,405,393; 4,483,894; 4,512,831; 4,515,646; 4,595,436; 4,611,044; 4,657,790; 4,696,849; 4,853,054; 4,853,280 and, 5,104,693. Typically a filler material is used to prepare a polyurethane formulation for carpet backing. The filler can replace some of the polymer required to prepare a polyurethane backed article, while maintaining bulk in the article. This can lower the cost of production of the article, since materials used as fillers are typically less expensive than the polymer material that is being replaced.

Cost reduction can be an incentive for increasing the volume of filler material incorporated into a polymer formulation. The amount of filler can be limited, however, by process parameters which are adversely affected by a high loading of filler. For example, the viscosity of a polyol mixture that includes a high concentration of filler can be increased such that the transport of the polyol mixture through a process line can be difficult or impossible. The difficulty can be exacerbated by contacting the polyol mixture with a polyisocyanate. Attempts to deliver the resulting reactive mixture to a carpet surface can produce line plugging. High viscosity also hinders the ability to properly place the resultant reactive mixture within a textured textile fabric. Further, high viscosity in a polyurethane-forming mixture can produce defects, such as gels, in a foam applied to a carpet substrate.

Non-reactive solvents or diluents can be useful in lowering the viscosity of highly filled polyol mixtures. Use of such diluents is known. However, use of a non-reactive diluent is not without problems. Adding a non-reactive diluent to lower the viscosity of a highly-filled polyol mixture can result in additional process steps to remove the diluent from the final product. Additional process steps or equipment can be required to capture volatile solvent emissions, recover or recycle used diluent, or otherwise dispose of used diluent. In addition, there is extra cost associated with supplying the diluent. These additional measures can add cost to a production process and defeat the purpose of a cost-saving measure.

It would be desirable in the art of preparing polyurethane-backed articles to increase the loading of filler in a polyurethane formulation without detriment to the process of preparing a polyurethane coating, or to the physical properties of a polyurethane-backed article. It would also be desirable to deliver a highly-filled polyurethane-forming composition to the surface of a carpet or textile substrate without incorporating a non-reactive diluent. Finally, it would be desirable in the art of preparing polyurethane-backed articles to use a process wherein an isocyanate can be used as a reactive diluent to deliver a polyurethane-forming mixture containing an isocyanate-reactive material to the surface of a carpet or textile substrate in a continuous process.

SUMMARY OF THE INVENTION

In one aspect, the present invention is a process for preparing a polyurethane-forming reactive mixture useful for preparing a polyurethane-backed article comprising simultaneously metering:
(a) an isocyanate-reactive material;
(b) a polyisocyanate; and
(c) a filler;
to a means for mixing (a), (b), and (c), thereby forming a polyurethane-forming reactive mixture, wherein the means for mixing (a), (b), and (c) is a low-shear or no-shear mixer.

In another aspect, the present invention is a process for preparing polyurethane-backed article comprising the steps:
(i) simultaneously metering:
(a) an isocyanate-reactive material;
(b) a polyisocyanate; and
(c) a filler;
to a means for mixing (a), (b), and (c), thereby forming a polyurethane-forming reactive mixture, wherein the means for mixing (a), (b), and (c) is a low-shear or no-shear mixer;
(ii) delivering the reactive mixture of step (i) to a pump;
(iii) pumping the reactive mixture to a second mixing means;
(iv) mixing the reactive mixture with a polyurethane catalyst and optional components to form a polyurethane-forming composition;
(v) delivering the polyurethane-forming composition to form a coating on a surface of a substrate; and
(vi) curing the polyurethane-forming composition on the surface of the substrate.

In another aspect, the present invention is a polyurethane-forming reactive mixture comprising: (a) an isocyanate-reactive material; (b) a polyisocyanate; and (c) a filler; wherein the filler is included at a concentration of at least about 300 parts per 100 parts of isocyanate-reactive material, and wherein the mixture is obtained according to the process comprising simultaneously metering:
(a) an isocyanate-reactive material;
(b) a polyisocyanate; and
(c) a filler;
to a means for mixing (a), (b), and (c), thereby forming a polyurethane-forming reactive mixture, wherein the means for mixing (a), (b), and (c) is a low-shear or no-shear mixer.

In still another aspect, the present invention is a continuous mixing process, useful for preparing an article having a filled polymer backing, comprising the steps of:
(i) simultaneously metering:
(a) an aqueous polymer dispersion; and
(b) a filler;
to a means for mixing (a) and (b), thereby forming an aqueous polymer/filler dispersion, wherein the means for mixing (a), and (b) is a low-shear or no-shear mixer;
(ii) delivering the aqueous dispersion of step (i) to a pump;
(iii) pumping the polymer composition to form a coat on a surface of a substrate.

The present invention has several benefits. For example, use of the present invention can: (1) reduce the cost of producing articles having attached polymer cushions; (2) eliminate the requirement for additional warehouse space to store blends of polyol and filler for preparing polyurethane-backed articles; and (3) provide flexibility to a carpet or textile fabric manufacturer with respect to the amount and identity of filler incorporated into a particular carpet or textile backing.

DESCRIPTION OF THE PREFERRED EMBODIMENTS

In one embodiment, the present invention is a method for preparing a highly-filled polyurethane-forming reactive mixture. The polyurethane-forming reactive mixture of the present invention comprises: an isocyanate reactive material, for example a polyol as described herein; a polyisocyanate; a filler; and, optionally, a filler wetting agent. As used herein, the terms "isocyanate" and "polyisocyanate" can be used interchangeably. The term "highly-filled" as used herein refers to a mixture having at least 300 parts of filler per 100 parts of an isocyanate reactive material. Highly-filled mixtures can be difficult to transfer in a process for preparing polyurethane-backed articles. For example, a highly filled mixture may have a viscosity which is high and be difficult to pump or transport through process equipment. In the process of the present invention, a polyisocyanate is used as a reactive diluent to facilitate the transfer of a polyurethane-forming reactive mixture, without premature viscosity build-up in the mixture.

The process of the present invention comprises the mixing of at least three separate streams to form a single reactive stream that can be used to prepare a polyurethane foam. The first stream (S1) includes an isocyanate reactive material such as, for example, an active hydrogen containing compound. Active hydrogen containing compounds are compounds having active hydrogen functionality, i.e., functional groups that react with Zerwitinov Reagent, wherein at least one hydrogen atom is bonded to an electronegative atom such as sulfur, nitrogen, or oxygen. Active hydrogen containing compounds described herein can contain any combination of hydroxyl, amino, and mercaptyl functionality in addition to other active hydrogen groups and can be reacted with isocyanate groups to form a polyurethane-forming reactive mixture useful for preparing a carpet backing under conditions suitable for carrying out the reaction. Isocyanate-reactive compounds suitable for the practice of the present invention are well-known to those skilled in the art of preparing polyurethane-backed carpets, and are not unique to the present invention.

A polyol is an example of an isocyanate-reactive compound of the present invention. A polyol of the present invention can have an average equivalent weight of from about 500 to about 5000, preferably from about 750 to about 2500, and more preferably from about 750 to about 2000. The average equivalent weight of a compound can be determined by dividing the average molecular weight of the compound by the functionality of the compound. While a wide range of materials can be used, polyether polyols are preferred based on their performance and wide availability. Polymers of propylene oxide which are at least partially end-capped with ethylene oxide are particularly preferred.

A polyurethane-forming reactive mixture of the present invention also includes a polyisocyanate material added as a second stream (S2). The identity of a polyisocyanate used in the present invention is not critical. The polyisocyanate can be aliphatic or aromatic. Aromatic polyisocyanates suitable for use herein include, for example: phenyl diisocyanate; 2,4-toluene diisocyanate; 2,6-toluene diisocyanate; ditoluene diisocyanate; naphthalene 1,4-diisocyanate; 2,4'- and/or 4,4'-diphenylmethane diisocyanate (MDI); polymethylene polyphenylenepolyisocyanates (polymeric MDI); like compounds, and mixtures thereof. Suitable aliphatic polyisocyanates include, for example: 1,6-hexamethylene diisocyanate; isophorone diisocyanate; 1,4-cyclohexyl diisocyanate; like compounds and mixtures thereof. Prepolymers prepared by reacting a polyol or chain extender with a polyisocyanate are suitable, as well.

A polyisocyanate can be used in an amount suitable to prepare a polyurethane-forming composition with an isocyanate index of from about 85 to about 130. The isocyanate index can be calculated by multiplying the ratio of isocyanate equivalents to active hydrogen equivalents by 100. Preferably the isocyanate index is in the range of from about 85 to about 115.

The present invention includes a filler material added as a third stream (S3). In the practice of the present invention, S3 is typically added as a dry stream. The filler material can be a conventional filler, such as, for example: milled glass, calcium carbonate, aluminum trihydrate (ATH), talc, bentonite, antimony trioxide, kaolin. The filler material can also be recycled waste material from a carpet manufacturing process. For example, recycled waste material can include: fibrous materials such as lint from a fabric shearing process; and polymer waste that is ground to particle sizes less than 2 mm, including rubber from tires, and polyurethane from carpet underlays. The filler can be fly ash, or any filler or mixture of fillers known to be useful in the art of preparing filled polymers. Any amount of filler can be used in the practice of the present invention, with the caveat that the viscosity of the reactive mixture cannot be too high to allow transfer of the mixture through the process, or result in defective polyurethane coatings, or result in obtaining articles of poor quality. The concentration of filler to be used can be determined by various factors, including the end-use application of the article, the cost of producing the article, or the affect of the filler on the color, texture, or other physical properties of the article.

The amount of filler to be used can also depend on process parameters. Typical fillers loaded at greater than 250 parts per 100 parts of isocyanate-reactive material can cause problems in a process for preparing a polyurethane carpet backing. For example, fillers can cause an unacceptable viscosity increase in a polyurethane-forming composition when included at a concentration of greater than 250 parts. In the present invention, filler can be loaded at concentrations greater than 300 parts of filler per 100 parts of an isocyanate reactive material to prepare a highly-filled polyurethane. To prepare a highly-filled polyurethane, preferably the filler is present at a concentration of from about 300 to about 1000 parts of filler per 100 parts of isocyanate-reactive material. More preferably the filler is loaded at a concentration of from about 300 to about 900 parts per 100 parts. Most preferably the filler is loaded at a concentration of from about 300 to about 800 parts per 100 parts of isocyanate-reactive material.

The present invention optionally includes a filler wetting agent. A wetting agent generally performs the function of compatiblizing the filler with the other components of a polyurethane-forming composition. A wetting agent can be particularly useful in preparing a highly-filled polyurethane mixture. Useful filler wetting agents can include ethoxylated phosphate esters in an organic carrier. Examples of suitable wetting agents include: Maphos* 56 (Trade Designation of PPG/Mazer Chemicals), Pegafax* 410 (Trade Designation of Borgwarner Chemicals), and Code 5027® (®Trade Designation of Fibro Chem, Inc.). Organosilane compounds and organotitanate compounds are suitable, as well. When used, a wetting agent can be included in a polyurethane-forming mixture of the present invention at a concentration of at least about 0.5 parts per 100 parts of filler, by weight. Preferably the filler wetting agent is included at a concentration of from about 0.5 to about 1.5 parts per 100 parts of filler, more preferably from about 0.75 to about 1.25 parts per 100 parts of filler. The wetting agent can be included in either S1 or S2. The wetting agent can alternatively can be added to both streams, as a separate stream, or added after obtaining the mixture in a subsequent step.

The present invention is a process by which S1, S2, and S3 are combined to form a single reactive stream (RS) useful for preparing a polyurethane carpet backing. A mixer suitable for the practice of the present invention is a low-shear type mixer, wherein mixing results in a thermal rise of less than 40° F. Preferably the observed thermal rise is less than 35° F., more preferably less than 30° F. As used herein, thermal rise is the difference between the temperature of: (1) S1, S2, and S3 as measured before mixing; and (2) RS immediately after mixing. A thermal rise outside of this range can result in a significant viscosity increase in the mixture due to a heat-catalyzed acceleration of the polyurethane-forming reaction. Mixers suitable for the practice of the present invention are known and are available commercially. Suitable low-shear mixers can be obtained from Bepex Corp., Oakes Corp., and Krupp Industrietechnik. A no-shear mixer can be suitable for the practice of the present invention. A suitable no-shear mechanical mixing device is described in U.S. Pat. No. 5,480,589.

In another embodiment, a means for cooling the reactive mixture can be provided such that a thermal rise of less than 40° F. is observed. For example, a mixer fitted with a cooling reservoir contacting the mixing chamber can be used to cool RS as it is obtained. Alternatively, RS can be cooled in a temperature-controlled pipeline to maintain a desirable temperature in the reactive mixture as it comes out of the mixer.

The reactive mixture of the present invention can be optionally combined in a subsequent step with other materials to obtain a polyurethane-forming composition useful for preparing polyurethane carpet backing. For example, RS can be combined with a catalyst, a filler wetting agent, a chain extender, a surfactant, a blowing agent, a flame retardant, pigments, antistatic agents, reinforcing fibers, antioxidants, preservatives, water scavengers, acid scavengers, and the like. Catalysts useful in the preparation of polyurethane carpet backings are known. Suitable catalysts include tertiary amines, and organometallic compounds, like compounds and mixtures thereof. For example, suitable catalysts include di-n-butyl tin bis (mercaptoacetic acid isooctyl ester), dimethyltin dilaurate, dibutyltin dilaurate, dibutyltin sulfide, stannous octoate, lead octoate, ferric acetylacetonate, bismuth carboxylates, triethylenediamine, N-methyl morpholine, like compounds and mixtures thereof. Examples of suitable blowing agents include gases such as air, carbon dioxide, nitrogen, argon, helium, and the like; liquids such as water, volatile halogenated alkanes such as the various chlorfluoromethanes and chlorfluoroethanes; azo-blowing agents such as azobis (formamide). Preferred in the practice of this invention is the use of a gas as a blowing agent. Particularly preferable is the use of air as a blowing agent.

In preparing polyurethane-backed carpets according to this invention, the individual components of the polyurethane-forming composition are mixed and applied as a layer of preferably uniform thickness onto one surface of the carpet substrate. As a second mixing means, conventional mixers are suitable for combining RS with optional components to form a polyurethane-forming composition of the present invention. A polyurethane-forming composition of the present invention can be obtained using equipment such as an Oakes or Firestone foamer, for example.

To prepare a carpet having a polyurethane attached cushion backing, a polyurethane-forming composition of the present invention can be applied to a surface of a carpet substrate and cured to a tack-free state. Typically the polyurethane-forming composition is applied to the backstitch of a tufted carpet substrate. The polyurethane-forming composition is typically applied to the carpet substrate before any substantial curing occurs, using equipment such as a doctor knife, air knife, or extruder to apply and gauge the layer. Alternatively, the polyurethane-forming composition can be formed into a layer on a moving belt or other suitable apparatus and partially cured, then married to the carpet substrate using equipment such as a double belt (also known as double band) laminator or a moving belt with an applied foam cushion. The amount of polyurethane-forming composition used can vary widely, from about 5 to about 500 ounces per square yard, depending on the characteristics of the textile. After the layer is applied and gauged, the layer is cured using heat from any suitable heat source such as an infrared oven, a convection oven, or heating plates. A temperature of from 100° C. to about 170° C., and a time of from about 1 minute to about 60 minutes are suitable for curing the polyurethane.

A polyurethane backed carpet can include a precoated and a laminate coat applied to the back of a carpet substrate. In addition, a backed carpet can optionally include an attached foam cushion that is applied to a carpet substrate. Generally, carpets having attached cushions are prepared by tufting or weaving yarn into a primary backing, applying an adhesive precoated to the primary backing to bind the tufted material into the backing, and then applying a polyurethane foam cushion. Use of any of the polyurethane coats can be optional in the practice of the present invention, as long as at least one coat of polyurethane is applied to a carpet substrate. For example, application of a separate polyurethane precoated can be eliminated by application of a sufficient amount of a laminate coat, such that the laminate coat soaks into the carpet weave and performs the function of both a precoated and a laminate coat. Similarly, a polyurethane foam coat can be applied in an amount sufficient to eliminate separate application of a polyurethane precoated and/or laminate coat.

A polyurethane-forming composition of the present invention can be used to coat a variety of substrates. For example the composition of the present invention can be used to coat textiles such as: broadloom carpet; carpet tile; automotive carpet; fabrics for automotive trim; paneling and trunk liners; synthetic playing surfaces; tennis ball covers; drapery fabrics; wall-covering fabric; woven and non-woven scrim and the like.

In another embodiment, the present invention is method of preparing a filled polymer composition that is useful for making polymer-backed articles. A filled polymer composition can be prepared according to the same process used to prepare a polyurethane-forming composition, except that in place of S1 and S2, an aqueous polymer dispersion (APD) can be combined with S3 to obtain an aqueous polymer/filler dispersion (PFD). Aqueous polymer dispersions suitable for use in the practice of the present invention are not unique to the present invention, and are known in the art of preparing water-born polymer emulsions. Aqueous polymer dispersions suitable for use in the present invention can be water emulsions of: styrene-butadiene copolymers (SB latex), ethylene-vinyl acetate copolymers (EVA latex), and styene-vinylidene chloride-butadiene tripolymer (SVB latex), for example. An aqueous polymer dispersion used herein can be prepared by any method known in the art of preparing aqueous polymer dispersions. Such methods are described in U.S. Pat. No. 3,962,170, for example.

A PFD of the present invention can be used to coat a variety of substrates. A PFD can be used in the same manner as polyurethane-forming formulations in applications described hereinabove. For example a PFD of the present invention can be used to coat textiles such as: broadloom carpet; carpet tile; automotive carpet; fabrics for automotive trim; paneling and trunk liners; synthetic playing surfaces; tennis ball covers; drapery fabrics; wall-covering fabric; woven and non-woven scrim and the like.

EXAMPLES

The following example is meant to be illustrative of the present invention. This example is not intended to limit the scope of the claims of the present invention and should not be interpreted in that manner.

Example 1

To a Hosokawa Bepex Model EM-6 Extrud-O-Mix operating at 480 rpm is simultaneously metered: 402.8 g/min of a blend of a 85/15 wt % mixture of Voranol® 9120 polyol (®Trademark of the Dow Chemical Co.) and dipropylene glycol; 229.6 g/min of Isonate 7594 isocyanate; 16.1 g/min of Code 5027® (®Trademark of Fibro Chem, Inc.); and 1619.4 g/min of WF75 ($CaCO_3$ filler available from Georgia Marble Co.). The components are mixed in the Extrud-O-Mix to form a reactive mixture. The reactive mixture exits the mixer into a receiver for a Roper model pump that delivers the material to a Kenics static mixer, where a 10 wt % solution of Fomrez® (®Trademark of the Witco Chemical Co.) UL6 catalyst in Voranol® 9287 polyol (®Trademark of the Dow Chemical Co.) is added at a rate of 0.9 g/min. The catalyzed polyurethane-forming composition is then applied to the back of a contract level loop grade of Structures II carpet (available from Shaw industries) and is cured in an oven for 8 minutes at 149° C. The results of testing the carpet are: coating weight—1349 $g/m^2$; tuft bind—8.7 Kg; edge curl—0.6 cm; edge ravel—1.27 Kg; and, hand punch—13.3 Kg.

What is claimed is:

1. A polyurethane-forming reactive mixture comprising:
   (a) an isocyanate-reactive material;
   (b) a polyisocyanate; and
   (c) a filler;
wherein the filler is included at a concentration of at least about 300 parts per 100 parts of isocyanate-reactive material, and wherein the mixture is obtained by continuously and simultaneously metering
   (a) an isocyanate-reactive material;
   (b) a polyisocyanate; and
   (c) a filler;
to a means for mixing (a), (b), and (c) wherein the means for mixing (a), (b), and (c), is a low-shear or no-shear mixer, and wherein a thermal rise of less than 40° F. is observed.

2. The mixture of claim 1 wherein the filler is present at a concentration of from about 300 to about 1000 parts per 100 parts of isocyanate-reactive material.

3. The mixture of claim 2 wherein the filler is present at a concentration of from about 300 to about 900 parts per 100 parts of isocyanate-reactive material.

4. The mixture of claim 3 wherein the filler is present at a concentration of from about 300 to about 800 parts per 100 parts of isocyanate-reactive material.

5. The mixture of claim 1 wherein a filler wetting agent is included.

6. The mixture of claim 1 wherein the filler includes recycled waste materials.

7. A polyurethane precoat prepared from the mixture of claim 1.

8. A polyurethane foam prepared from the mixture of claim 1.

* * * * *